(No Model.)
J. C. HACKETT.
HAME FASTENING.
No. 345,134. Patented July 6, 1886.
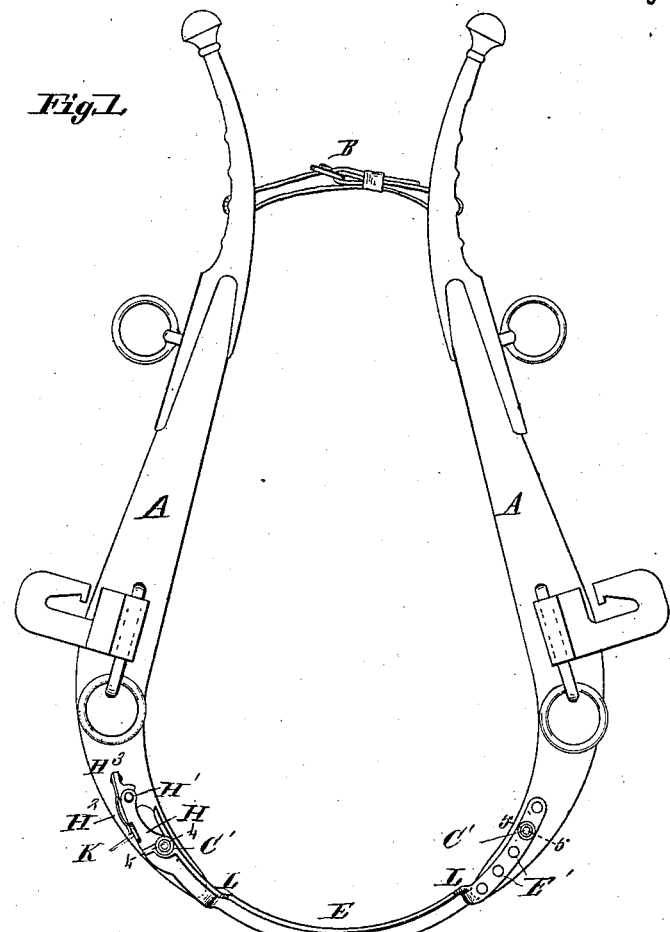
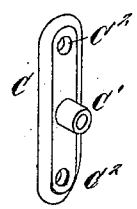
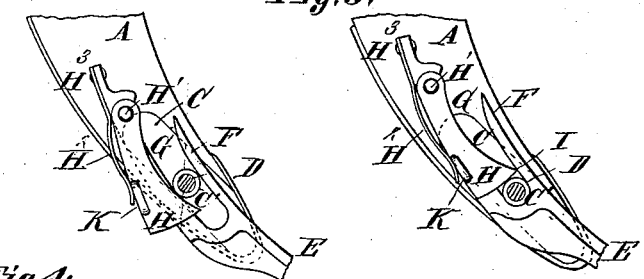
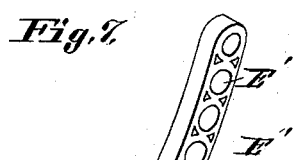
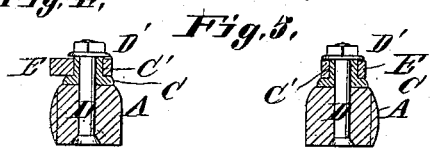
Inventor:
Jno. C. Hackett
By Knight Bros.
Att'ys
Attest:
Edward Stur.
F. A. Hopkins

UNITED STATES PATENT OFFICE.

JOHN C. HACKETT, OF BELLEVILLE, ILLINOIS.

HAME-FASTENING.

SPECIFICATION forming part of Letters Patent No. 345,134, dated July 6, 1886.

Application filed March 22, 1886. Serial No. 196,121. (No model.)

*To all whom it may concern:*

Be it known that I, JOHN C. HACKETT, of Belleville, in the county of St. Clair and State of Illinois, have invented a certain new and useful Improvement in Hame-Fastenings, of which the following is a full, clear, and exact description, reference being had to the accompanying drawings, forming part of this specification, and in which—

Figure 1 is an elevation of a pair of hames with my improvement applied. Fig. 2 is an enlarged view of the lower end of one of the hames, showing that end of the tie-bar which engages therewith, the latch or detent hereinafter referred to being shown in retracted position. Fig. 3 is a similar view showing the latch or detent in engagement. Fig. 4 is a transverse section taken on line 4 4, Fig. 1. Fig. 5 is a similar view taken on line 5 5, Fig. 1. Fig. 6 is an enlarged perspective view of one of the journal-brackets. Fig. 7 is an enlarged perspective view of the tie bar.

My invention relates to an improved hame-fastening, intended more particularly for securing together the lower ends of the hames, but which could be applied to the upper ends of the hames, if desired; and my invention consists in features of novelty hereinafter fully described, and pointed out in the claims.

Referring to the drawings, A represents the hames, which I have shown connected at top by an ordinary strap, B. To the lower end of each hame is secured a bracket or plate, C, upon each of which is secured or formed a journal projection, C'. These journal projections C' are made hollow, as shown, to receive bolts D, which pass through the hames, and have nuts or heads D' on their outer ends. They are preferably countersunk into the hames, as shown in Figs. 4 and 5. The bolts D serve to secure the bracket C to the hames, and in addition to these bolts the bracket may be secured to the hames by screws passing through holes or perforations C². The heads D' of the bolts also serve to hold the tie-bar to the hames when in place.

E represents the tie-bar. It has perforations E' in one end, to fit over one of the journal projections C', as shown in Figs. 1 and 5. It is held upon the projection by a nut, D', on the bolt D on this hame, as stated. The tie-bar bears upon the projection C', upon which the nut of the bolt also bears, leaving the tie-bar to move freely on the journal. The other end of the tie-bar is so constructed that it can be quickly and easily attached to and detached from the journal C' on the end of the other hame to the one just mentioned. This I construct as follows:

F represents a lip formed upon the end of the tie-bar, and forming a slot, G, as shown most plainly in Fig. 7. This slot receives the journal C', as shown in Figs. 1, 2, 3, and 4.

H represents a latch or detent, pivoted at H' to the end of the tie-bar, and held in its inner position by a spring, H², the spring being secured at H³ to the tie-bar. As stated, the spring holds the latch or detent in its inner position, where its point I extends over the slot G, forming an eye, J, which receives the journal C' when the tie-bar is in its using position.

The latch or detent H has an inclined face, I', against which the projection C' bears as the tie-bar is forced toward the journal projection C', forcing the latch or detent back into the position shown in Fig. 2. As soon as the inner end of the latch or detent passes the projection it is sprung inward, as shown in Fig. 3, by the spring H², and holds the tie-bar on the journal C'. It will thus be seen that this end of the tie-bar can be readily attached to the hame, and that it will be automatically held there by the latch or detent H.

When it is desired to disconnect the hames, it can be done by simply pulling back on the latch or detent, for which purpose it is provided with a projection, K, against which a finger or thumb may be placed to force it back.

The tie-bar, as will be seen, is secured to the outer face of the hames. This would cause the tie-bar, if it were straight, to fit outside of the hame-groove in the collar, which would not be as satisfactory as to have it fitting in the groove, for in the latter case it would work more snugly, have a better appearance, and would also serve to hold the hames upon the collar. In order that the tie-bar may thus fit in the groove, I form it with return-bends L, which bring the body in line with the inner face of the hames, so that it will fit in the groove in the bottom of the collar, while its ends are in a different plane—*i. e.*, that of the outer surface of the hames. By means of a number of perforations E′, the hinged end of the tie-bar may be adjusted to give any desired length.

I claim as my invention—

1. The combination, with the hames, of a tie-bar hinged at one end to one of the hames and having at the other end a groove, a projection from the other hame adapted to enter said groove, and a latch or detent secured to the free end of tie-bar for securing the said parts, substantially as set forth.

2. The combination, with the hames, of a tie-bar hinged at one end to one of the hames and having at the other end a groove, a projection from the other hame adapted to enter said groove, a latch or detent pivoted to said tie-bar and adapted to engage said projection, and a spring for holding it normally in engaging position, substantially as set forth.

3. The combination, with the hames A, of the tie-bar E, hinged at one end to one of said hames and having at the other end the groove G, the stud C′, projecting from the other of said hames, the latch or detent H, pivoted to the tie-bar at H′, and having the inclined face I′, and the spring H², holding said latch or detent normally across the groove G, substantially as and for the purpose set forth.

4. The combination, with the hames, of a metallic tie-bar formed in two planes united by bends or offsets, and constructed to engage the lower ends of the hames, substantially as and for the purposes set forth.

5. The combination, with the hames A, each having the studs C′ projecting from the face thereof, of the tie-bar E, engaging at its respective extremities with said studs, and formed in two planes or with return-bends L, substantially as and for the purposes set forth.

JOHN C. HACKETT.

In presence of—
GEO. H. KNIGHT,
JOS. WAHLE.